(12) United States Patent
Ruiz et al.

(10) Patent No.: US 9,349,199 B2
(45) Date of Patent: May 24, 2016

(54) SYSTEM AND METHOD FOR GENERATING IMAGE WINDOW VIEW SETTINGS

(75) Inventors: Guillermo Ruiz, Paris (FR); Celine Pruvot, Buc (FR); Jean-Marc Treutenaere, Aix en Provence (FR)

(73) Assignee: General Electric Company, Schenectady, NY (US)

( * ) Notice: Subject to any disclaimer, the term of this patent is extended or adjusted under 35 U.S.C. 154(b) by 554 days.

(21) Appl. No.: 13/458,311

(22) Filed: Jun. 26, 2012

(65) Prior Publication Data

US 2013/0343622 A1    Dec. 26, 2013

(51) Int. Cl.
*G06K 9/00* (2006.01)
*G06T 11/00* (2006.01)
*G06T 5/00* (2006.01)

(52) U.S. Cl.
CPC ............... *G06T 11/008* (2013.01); *G06T 5/007* (2013.01); *G06T 2207/10081* (2013.01)

(58) Field of Classification Search
None
See application file for complete search history.

(56) References Cited

U.S. PATENT DOCUMENTS

| | | | |
|---|---|---|---|
| 5,305,204 A | 4/1994 | Ohhashi | |
| 7,218,763 B2 | 5/2007 | Belykh | |
| 7,660,488 B2 | 2/2010 | Reicher | |
| 2009/0080743 A1 | 3/2009 | Launay et al. | |
| 2010/0174174 A1* | 7/2010 | Kabasawa | 600/419 |
| 2010/0189375 A1* | 7/2010 | Bertens et al. | 382/274 |
| 2011/0228997 A1* | 9/2011 | Sharp et al. | 382/131 |

* cited by examiner

*Primary Examiner* — Atiba O Fitzpatrick
(74) *Attorney, Agent, or Firm* — Dean D. Small; The Small Patent Law Group, LLC

(57) ABSTRACT

A method for generating an image of an obtaining a three-dimensional (3D) volume dataset of an object of interest, automatically analyzing the 3D volume dataset to generate a window level setting, automatically generating a window width setting based on the window level setting, and automatically displaying an image of the object of interest using the window width setting. An imaging system and a non-transitory computer readable medium are also described.

18 Claims, 7 Drawing Sheets

SYSTEM AND METHOD FOR GENERATING IMAGE WINDOW VIEW SETTINGS

BACKGROUND OF THE INVENTION

The subject matter described herein relates generally to imaging systems, and more particularly, to a system and method for generating image window view settings.

Imaging systems are widely used to generate images of various anatomical features or objects of interest. For example, computed tomography (CT) imaging systems may be utilized to generate images of a patient's vasculature, organs, bones, soft tissue, or other objects of interest. In operation, the CT imaging system projects an x-ray beam through an object being imaged, such as the patient. The x-ray beam, after being attenuated by the patient, impinges upon a detector. The intensity of the attenuated x-ray beam received at the detector is dependent upon the attenuation of the x-ray beam by the object. Each detector element of the array produces a separate electrical signal that is a measurement of the x-ray beam intensity at the detector location.

The intensity measurements from the detector elements are acquired separately to produce a set of x-ray attenuation measurements, i.e., projection data. The projection data is then used to generate an image of the object that is viewed on a display. Some images may cover a large area of the patient whereas the user is generally interested in viewing a smaller region of interest within the image to perform, for example, a diagnosis of the patient. Accordingly, at least one conventional imaging system enables the user to manually adjust various imaging parameters to optimize the region of interest of concern to the user. For example, one region of the image may depict the liver and another region may depict the lungs.

Accordingly, if the user is primarily concerned with viewing the lungs, the conventional imaging system enables the user to manually adjust various parameters in the image representing the lungs and to therefore generate an enhanced or improved image of the lungs. However, the user typically desires to observe many images of the lungs to perform the diagnosis. Thus, the user is required to manually adjust the viewing parameters for each image individually. Accordingly, the manual features on the conventional imaging system are time consuming to operate and may therefore increase the time required by the user to perform a diagnosis of the patient. Moreover, because the optimal viewing parameters are related to a particular region of interest being viewed, the user generally relies on his own knowledge of the imaged anatomy to change the viewing parameters. Thus, inexperienced users may not have the knowledge to properly adjust the various parameters to generate an enhanced image of the region of interest.

SUMMARY OF THE INVENTION

In one embodiment, a method for generating an image of an object is provided. The method includes obtaining a three-dimensional (3D) volume dataset of an object of interest, automatically analyzing the 3D volume dataset to generate a window level setting, automatically generating a window width setting based on the window level setting, and automatically displaying an image of the object of interest using the window width setting.

In another embodiment, an imaging system is provided. The imaging system includes an imaging scanner and a processor coupled to the imaging scanner. The processor is configured to receive a three-dimensional (3D) volume dataset of an object of interest, automatically analyze the 3D volume dataset to generate a window level setting, automatically generate a window width setting based on the window level setting, and automatically display an image of the object of interest using the window width setting.

In a further embodiment, a non-transitory computer readable medium is provided. The non-transitory computer readable medium is programmed to instruct a computer to receive a three-dimensional (3D) volume dataset of an object of interest, automatically analyze the 3D volume dataset to generate a window level setting, automatically generate a window width setting based on the window level setting, and automatically display an image of the object of interest using the window width setting.

DETAILED DESCRIPTION OF THE INVENTION

Figure 1:
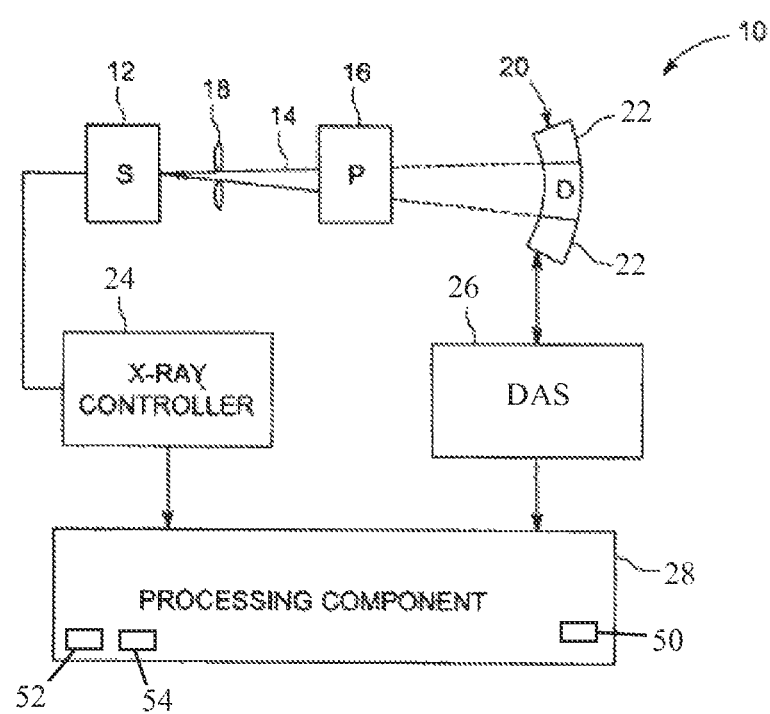
FIG. 1 is a simplified block diagram of a computed tomography (CT) imaging system that is formed in accordance with various embodiments

The foregoing summary, as well as the following detailed description of various embodiments, will be better understood when read in conjunction with the appended drawings. To the extent that the figures illustrate diagrams of the functional blocks of the various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Although various embodiments are described with respect to a computed tomography (CT) imaging system, it should be noted that the method and apparatus for automatically generating an image viewing window described herein may be modified for use with other imaging systems. For example, the method and system may be utilized with a Positron Emission Tomography (PET) system, a Single Photon Emission Computed Tomography (SPECT) system, a Magnetic Resonance Imaging (MRI) system, an ultrasound imaging system, and/or an X-ray system, among others.

In various embodiments, a method and/or apparatus is provided that automatically generates an image viewing window having a predetermined window level and a predetermined window width. A technical effect of various embodiments is to automatically adjust a window level and a window width of an image being viewed by the user.

FIG. 1 is a simplified block diagram of a CT imaging system 10 that is formed in accordance with various embodiments. The imaging system 10 may be utilized to acquire x-ray attenuation data at numerous views around a volume undergoing imaging (e.g., a patient, package, manufactured part, and so forth). The imaging system 10 includes an x-ray source 12 that is configured to emit radiation, e.g., x-rays 14, through a volume containing a subject 16, e.g. a patient being imaged.

In the embodiment shown in FIG. 1, the imaging system 10 also includes an adjustable collimator 18. In operation, the emitted x-rays 14 pass through an opening of the adjustable collimator 18 which limits the angular range associated with the x-rays 14 passing through the volume in one or more dimensions. More specifically, the collimator 18 shapes the emitted x-rays 14, such as to a generally cone or generally fan shaped beam that passes into and through the imaging volume in which the subject 16 is positioned. The collimator 18 may be adjusted to accommodate different scan modes, such as to provide a narrow fan-shaped x-ray beam in a helical scan mode and a wider cone-shaped x-ray beam in an axial scan mode. The collimator 18 may be formed, in one embodiment, from two cylindrical disks that rotate to adjust the shape or angular range of the x-rays 14 that pass through the imaging volume. Optionally, the collimator 18 may be formed using two or more translating plates or shutters. In various embodiments, the collimator 18 may be formed such that an aperture defined by the collimator 18 corresponds to a shape of a radiation detector 20.

In operation, the x-rays 14 pass through or around the subject 16 and impinge the detector 20. The detector 20 includes a plurality of detector elements 22 that may be arranged in a single row or a plurality of rows to form an array of detector elements 22. The detector elements 22 generate electrical signals that represent the intensity of the incident x-rays 14. The electrical signals are acquired and processed to reconstruct images of one or more features or structures within the subject 16. In various embodiments, the imaging system 10 may also include an anti-scatter grid (not shown) to absorb or otherwise prevent x-ray photons that have been deflected or scattered in the imaging volume from impinging on the detector 20. The anti-scatter grid may be a one-dimensional or two-dimensional grid and/or may include multiple sections, some of which are one-dimensional and some of which are two-dimensional.

The imaging system 10 also includes an x-ray controller 24 that is configured to provide power and timing signals to the x-ray source 12. The imaging system 10 further includes a data acquisition system 26. In operation, the data acquisition system 26 receives data collected by readout electronics of the detector 20. The data acquisition system 26 may receive sampled analog signals from the detector 20 and convert the data to digital signals for subsequent processing by a processor 28. Optionally, the digital-to-analog conversion may be performed by circuitry provided on the detector 20.

The processor 28 is programmed to perform functions described herein, and as used herein, the term processor is not limited to just integrated circuits referred to in the art as computers, but broadly refers to computers, microcontrollers, microcomputers, programmable logic controllers, application specific integrated circuits, and other programmable circuits, and these terms are used interchangeably herein. The processor 28 may be embodied as any suitably appropriate computing device, e.g., a computer, personal digital assistant (PDA), laptop computer, notebook computer, a hard-drive based device, smartphone, or any device that can receive, send, and store data.

The imaging system 10 also includes a window generating module 50 that is configured to receive an image dataset, such as a transmission dataset 52, and implement various methods described herein. For example, the window generating module 50 may be configured to generate a viewing window having a predetermined window level and predetermined window width that are automatically determined based on the subject being viewed. The window generating module 50 may be implemented as a piece of hardware that is installed in the processor 28. Optionally, the window generating module 50 may be implemented as a set of instructions that are installed on the processor 28. The set of instructions may be stand alone programs, may be incorporated as subroutines in an operating system installed on the processor 28, may be functions that are installed in a software package on the processor 28, or may be a combination of software and hardware. It should be understood that the various embodiments are not limited to the arrangements and instrumentality shown in the drawings.

Figure 2:
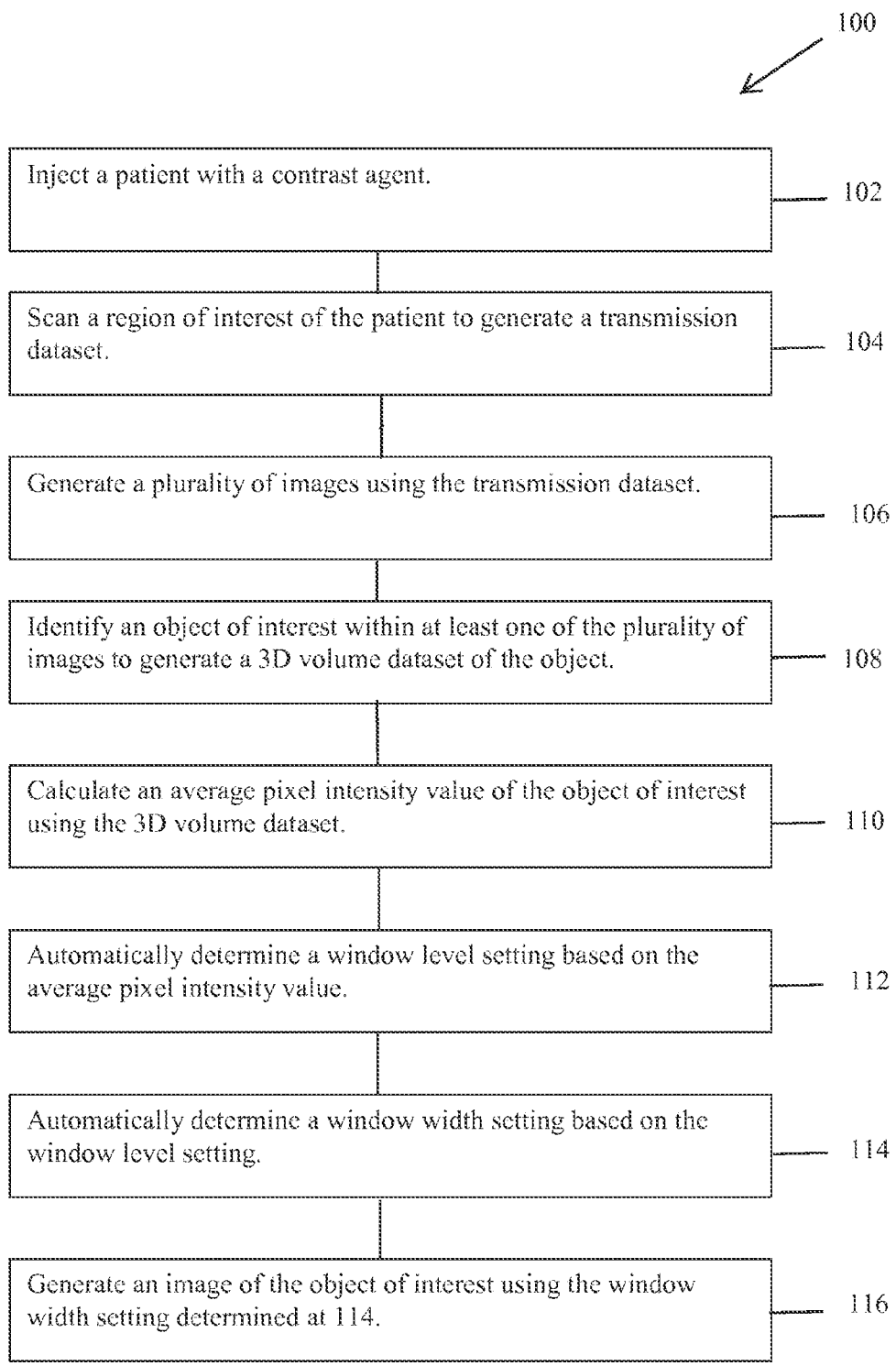
FIG. 2 is a flowchart of a method for reconstructing an image of an object in accordance with various embodiments.

FIG. 2 is a flowchart of a method 100 for reconstructing an image of an object in accordance with various embodiments. The method 100 may be implemented as a set of instructions on the processor window generating module 50 and/or the processor 28 both shown in FIG. 1. More specifically, the method 100 may be provided as a non-transitory machine-readable medium or media having instructions recorded thereon for directing the processor 28 or the window generating module 50 to perform an embodiment of the method described herein. The medium or media may be any type of CD-ROM, DVD, floppy disk, hard disk, optical disk, flash RAM drive, or other type of computer-readable medium or a combination thereof.

The method 100 automatically generates a set of viewing parameters that are then automatically applied to an image being displayed. The set of viewing parameters may include a window level setting and a window width setting. A window level setting is defined by a single pixel density value that is preselected based on a region of interest. In one embodiment, the region of interest is automatically selected without user interaction. Optionally, the region of interest may be manually selected. A window width setting is defined by a range of pixel density values around the window level setting value. For example, the window generating module 50 may automatically generate a window level setting of, for example, 1000 Hounsfield units (HU). The window generating module may further automatically generate a window width setting of, for example, ±500 HU. Thus, if the window level setting is automatically set to 1000 HU and the window width setting is automatically set to 500 HU, the pixels in the image will be adjusted to have a range between 500 HU and 1500 HU.

Referring again to FIG. 2, at 102, a contrast agent is injected to a patient. It should be realized that the exemplary embodiment is described herein with respect to assessing a patient's coronary heart disease. Thus, step 102 refers to injecting the subject 16 with a contrast agent. However, it should be realized that in other embodiments where a contrast agent is not desired to perform imaging, that step 102 is optional.

Figure 3:
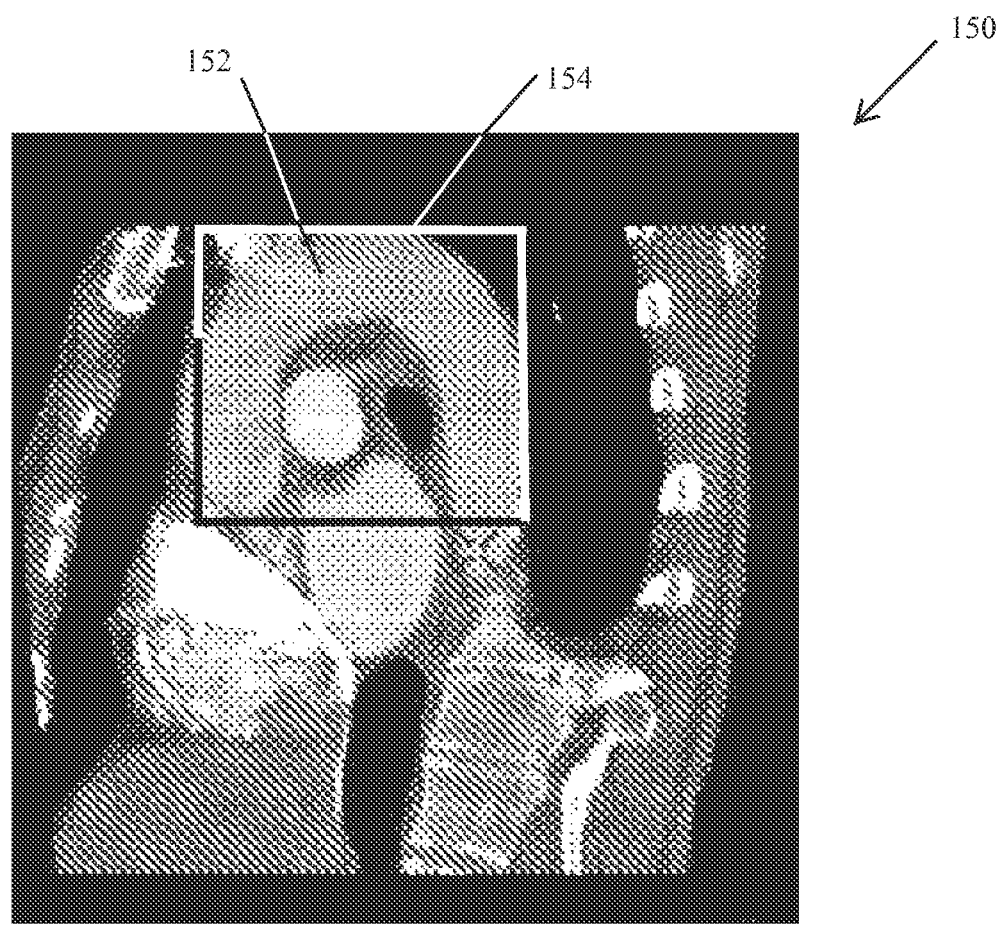
FIG. 3 is an image that may be reconstructed in accordance with various embodiments.

At 104, the subject 16 is scanned to generate a transmission dataset, such as for example, the transmission dataset 52 shown in FIG. 1, also referred to herein as CT projection data. It should be realized that although the method 100 is described with respect to the transmission dataset 52 obtained from the CT imaging system 10, the method 100 may also be applied to a transmission dataset obtained from a CT imaging system forming a part of a dual-modality imaging system. Moreover, the method 100 may be applied to any image dataset obtained using any of the imaging modalities discussed herein and the transmission dataset 52 is exemplary only. Accordingly, in various embodiments, the transmission dataset 52 is obtained using the CT imaging system 10 (shown in FIG. 1). The transmission dataset 52 may be obtained by performing scan of the subject 16 to produce the transmission dataset 52. In various other embodiments, the transmission dataset 52 may be obtained from data collected during a previous scan of the subject 16, wherein the transmission dataset 52 has been stored in a memory. The transmission dataset 52 may be obtained during real-time scanning of the subject 16. For example, the methods described herein may be performed on transmission data as the transmission data is received from the detector 20 during a real-time examination of the subject 16. At 106, the transmission dataset 52 is utilized to generate a plurality of images. FIG. 3 illustrates an exemplary image 150 that may be generated at 106.

At 108, an object of interest 152 is identified within at least one of the plurality of images, such as the image 150 shown in FIG. 3. In the exemplary embodiment, the image 150 is a CT image of a patient's torso and the object of interest 152 is an aorta. However, it should be realized that other areas of the patient's body may be imaged and the object of interest 152 may be different than the aorta. The object of interest 152 may be identified by the user by manually positioning a marker that identifies the location of the object on the image 150, for example.

At 110, the object of interest 152 is segmented from the transmission dataset 52 to generate a 3D volume dataset 54 that includes primarily the object of interest 152. In various embodiments, the 3D volume dataset 54 includes intensity information that represents primarily the aorta. More specifically, the 3D volume dataset 54 is formed from a plurality of slices, also referred to herein as a cardiac window, wherein each slice shows a portion of the aorta. In various embodiments, the aorta may be segmented or extracted from the transmission dataset 52 to form the 3D volume dataset 54 in accordance with the method 200 shown in FIG. 4.

In the exemplary embodiment, the detection of the aorta is based on the detection of the ascending and descending aorta in the same slice (which is found just at the beginning of the aorta, below the aortic arch). This slice, also referred to herein as the upper or first slice, is considered to be the beginning of the cardiac window. As discussed above, to generate the cardiac window, the patient is injected with a contrast agent in order to make the various cardiac vessels stand out and to render the vessels easily visible in relation to the other structures. It should be realized that the method 200 may be implemented using the image 150 or using a portion or all of the transmission dataset 52.

Figure 4:
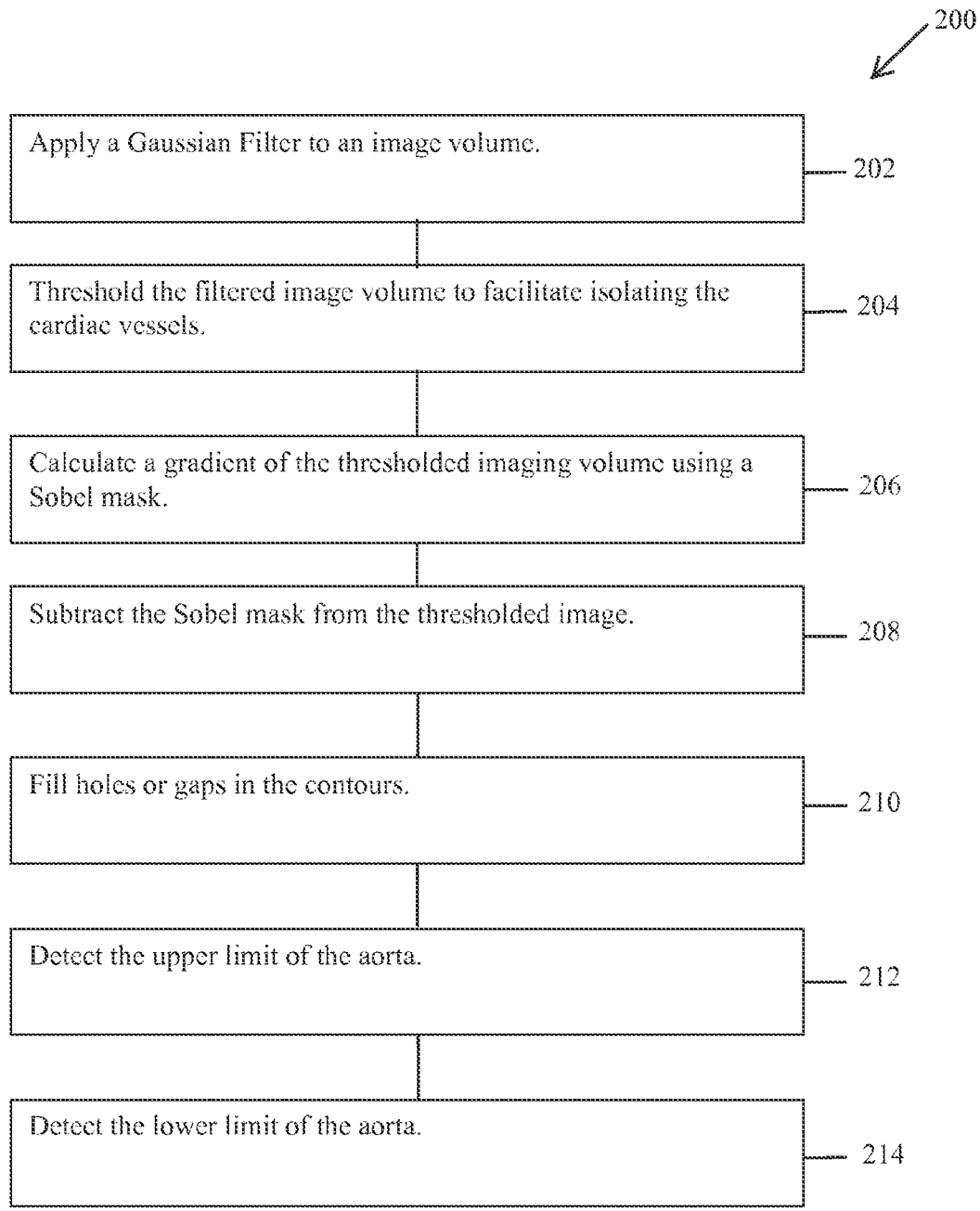
FIG. 4 is a flowchart of a method for segmenting an image of an object in accordance with various embodiments.

Referring to FIG. 4, at 202, a Gaussian Filter is applied to the image volume 150. In operation, the Gaussian filter facilitates reducing the noise in the image volume 150 that may be generated during the examination.

At 204, the filtered image volume 150 is thresholded, for example based on the Hounsfield units, to facilitate isolating the cardiac vessels. In various embodiments, thresholding may not be sufficient to separate the aorta from its surroundings. More specifically, thresholding may result in portions of the image being blurry, for example, by rendering the contours of the cardiac vessels less sharp, thus despite the proximity in levels of gray, the gradient is not negligible and may therefore be used as described below. Accordingly, in some embodiments, the contours are extracted to create a mask. The mask is then subtracted from the thresholded volume.

At 206, the gradient is calculated using, for example, a Sobel mask. In general, the intensity values are lower in the interior of cardiac vessels since there is more attenuation by the filtering (there is less noise). Moreover, the contours are also a bit less thick and less important than if the filtering had not been applied. In various embodiments, a threshold is chosen for the gradient, and as a result only the contours are used to create the subtraction mask which corresponds to the image of the gradient after thresholding.

At 208, the Sobel mask is subtracted from the thresholded image such that several structures are detached. This allows the separation of the ascending aorta of the pulmonary aorta, which are often positioned closely together.

At 210, holes or gaps in the contours are filled. More specifically, various holes in the image may be formed as a result of the thresholding and subtraction of the contours. These holes or gaps may cause the image of the aorta to appear as less circular and may also disturb the measures of eccentricity. Accordingly, the holes or gaps are filled to generate a smoothing effect around the structures.

At 212, the upper limit of the aorta is detected. More specifically, once the pre-processing is completed, as described in steps 202-210, the image volume 150 is analyzed to extract and evaluate several descriptors of the connecting components within the image volume 150, including for example, the size, position, eccentricity, mean intensity value, standard deviation of the pixel intensity values, etc. Thus, the position and other descriptors of the ascending and descending aorta for each slice may be isolated from other components in the image volume 150 and saved.

Figure 5:
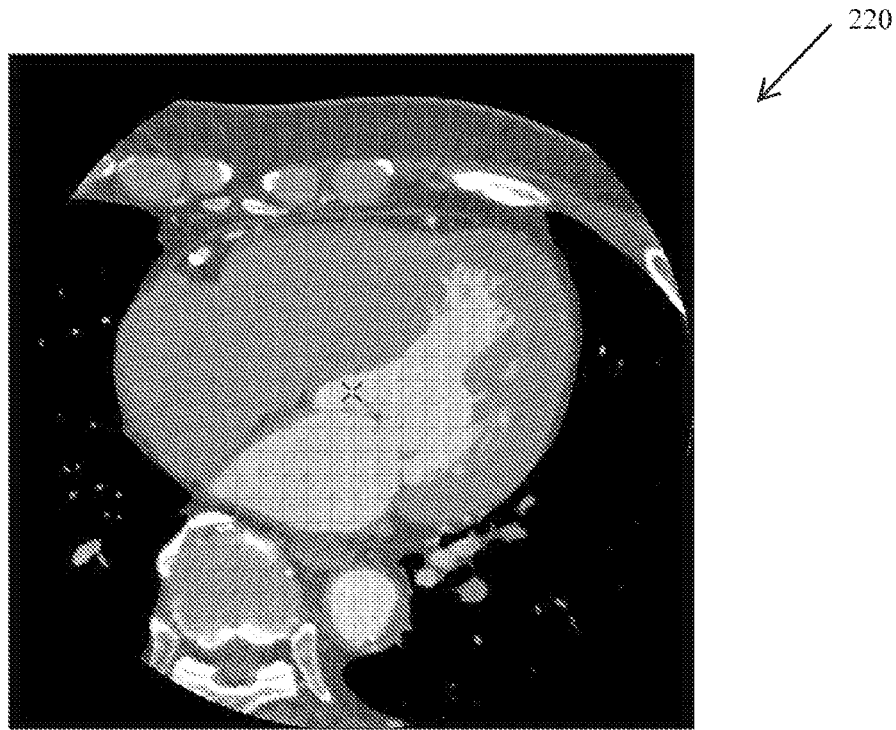
FIG. 5 is another image that may be reconstructed in accordance with various embodiments.

To locate the upper portion of the aorta, two consecutive slices containing the two parts of the aorta, i.e. the ascending and descending aorta are identified. At 214, the lower portion of the aorta is then identified by determining the location of the lungs. More specifically, based on information in the image volume 150, the lungs are identified and the lower limit of the aorta in the cardiac window is then identified based on the position or location of the lungs. Accordingly, the method 200 automatically identifies the upper slice and the lower slice showing the aorta. Thus, in various embodiments, the upper slice, the lower slice, and any slices between the upper and lower slices form the 3D volume dataset 54, shown in FIG. 1, of the aorta segmented as described in method 200. The 3D volume dataset 54 may then be utilized to generate an image, such as the image 220 shown in FIG. 5. It should be realized that although FIG. 5 illustrates a 2D image of the aorta, that 3D volume dataset 54 may also be utilized to generate a 3D image of the aorta.

In some embodiments, the image 220 may still include objects other than the aorta whereas the user may only be interested in viewing the aorta itself to perform, for example, a diagnosis of the patient. For example, the image 220 shows the aorta, and also shows various bones and portions of other organs. However, the optimal pixel intensity values are related to a particular region of interest being viewed. Accordingly, the optimal pixel intensity values for displaying an image of the aorta may be different than the optimal pixel intensity values for displaying an image of the bones or other organs.

For example, when a user desires to assess coronary disease in Computed Tomography Angiography (CTA) images, the user desires to generate images that provide optimal views of the aorta. As discussed above, the images of the aorta are generated based on the attenuation signals received from the detector 20 (shown in FIG. 1). To generate an image, such as the image 220 shown in FIG. 5, the processor 28 or the window generating module 50 assigns each pixel a numerical value (CT number). The CT numbers are represented as Hounsfield units, which may range, for example, between −1000 and +4096. Larger CT numbers are assigned to structures that create greater attenuation. For example, a pixel representing air may be assigned a CT number of negative 1000 while a pixel representing water may be assigned a CT number of zero. Pixels representing bones with higher densities may be assigned a higher positive CT number than pixels representing soft tissue or bones with lower densities, comparatively. The CT numbers are then used to reconstruct an anatomical image of the object being scanned.

In various embodiments, the method 100 automatically sets the window level and the window width of the image 220 to optimize the pixel intensity values of the object being displayed. For example, assume that the user wishes to view an image of the aorta. Initially, a contrast agent is injected into the patient. The patient is then scanned to generate the transmission dataset 52. The transmission dataset 52 is then segmented to generate a 2D or 3D volume dataset that includes primarily scan data of the aorta. The 2D or 3D volume datasets 54 may then be used to generate a plurality of images of the aorta. However, in some embodiments, a portion of the images may still include other objects or features that are not desired to be viewed by the user such as for example, the abdomen or the neck.

Accordingly, to improve the pixel intensity values of the aorta, and thus de-accentuate other organs or structures, the window generating module 50 is programmed to automatically set the window level and the window width of the aorta image. As described above, the window level is defined as a single pixel density value that is preselected based on a region of interest selected by the user. A window width setting is defined as a range of pixel density values around the window level setting value. Accordingly, in various embodiments, the window level setting and the window width setting are automatically determined based on the object of interest being examined, which in one embodiment is the aorta. However, it should be realized that the window level and window width settings may be automatically determined and applied to an image based on any object being imaged, and the aorta is an example of one such object.

Referring again to FIG. 2, at 110, an average pixel intensity value of the aorta is calculated using the 3D volume dataset 54. In various embodiments, to calculate the average pixel intensity value, the pixel intensity value for each pixel in the 3D volume dataset 54 is determined. Optionally, if viewing a 2D image, the pixel intensity value for each pixel in a 2D image is determined. The pixel intensity values are then summed together. The quantity of pixels forming either the 3D image or the 2D image is then determined. To generate the average pixel intensity value, the sum of the pixel intensity values is then divided by the quantity of pixels in the image.

At 112, the window level setting is automatically determined based on the average pixel intensity value determined at 110. In various embodiments, the window level is automatically set to be equal to the average pixel intensity value determined at 110. Assuming that the aorta is considered to be a soft tissue, the average pixel intensity value of the contrast agent injected at 102 may be between, for example, 0 HU and 800 HU. For example, assume that in the exemplary embodiment, the average pixel intensity value for the contrast agent injected at step 110 is 200 HU. Accordingly, at 112 the window generating module 50 is programmed to automatically set the window level to 200 HU.

At 114, the window width setting is automatically determined based on the window level setting generated at 112. In various embodiments, the window width setting is a range of HU values that are determined based on the window level setting. For example, in the exemplary embodiment, the window level setting determined at 112 is 200 HU. Accordingly, in the exemplary embodiment, the window width setting is a range of HU values wherein a center of the range is 200 HU. In various embodiments, the window width setting is determined based on the object being imaged. For example, air is well defined from 0-800 HU. Accordingly, the window width setting may be centered around 800 HU. Moreover, bone is well defined above 2000 HU. Accordingly, a window width setting to view a bone may be centered around 2000 HU. Moreover, soft tissue, such as the aorta, is well defined between 0 HU and 800 HU. Accordingly, a window width setting to view soft tissue may be centered around 400 HU.

In the exemplary embodiment, the window width setting is automatically set to be three times the value of the window level setting. For example, in the exemplary embodiment, the user desires to view an optimal image of the aorta. Accordingly, the window level setting generated at 112 is 200 HU. Therefore, 200 HU times three is 600 HU. Accordingly, in the exemplary embodiment, the window width setting is 600 HU and centered around 200 HU. Therefore, pixel values between −100 HU and 500 HU are automatically displayed. Thus, the window has a width of 600 HU.

Figure 6:
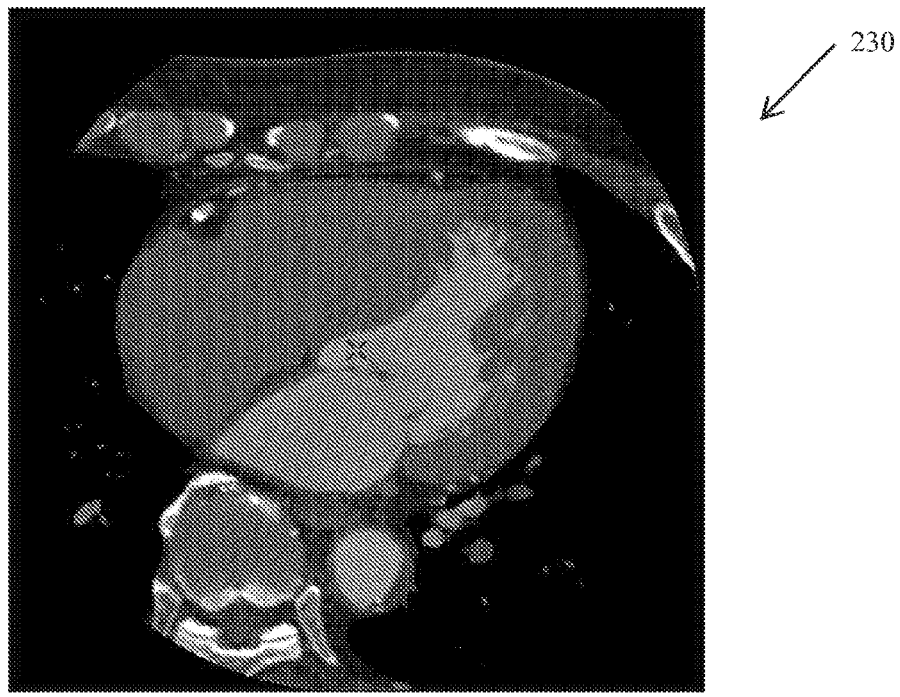
FIG. 6 is still another image that may be reconstructed in accordance with various embodiments.

Referring again to FIG. 2, at 116, the window width setting determined at 114 is utilized to generate an image of the object 16. FIG. 6 illustrates an exemplary image 230 that may be generated at 116. In various embodiments, the image 230 is generated using pixels having an intensity value that falls within the window width level determined at 114. Accordingly, in the exemplary embodiment, the image 230 only includes pixels having an intensity value between −100 HU and 300 HU.

Described herein are embodiments that are configured to automatically analyze a 3D dataset of an object of interest to generate a set of viewing parameters that are optimized based on the object of interest. In various embodiments, the window level setting and the window width setting facilitate enabling a user to more accurately diagnose, for example, coronary heart disease. More specifically, automatically setting the window level and the window width facilitates increasing the visualization of the aorta by generating an image that more accurately visualizes the edge between the contrast product in the coronary vessel as well as the wall of the vessel, therefore enabling a more accurate assessment of coronary disease.

Figure 7:
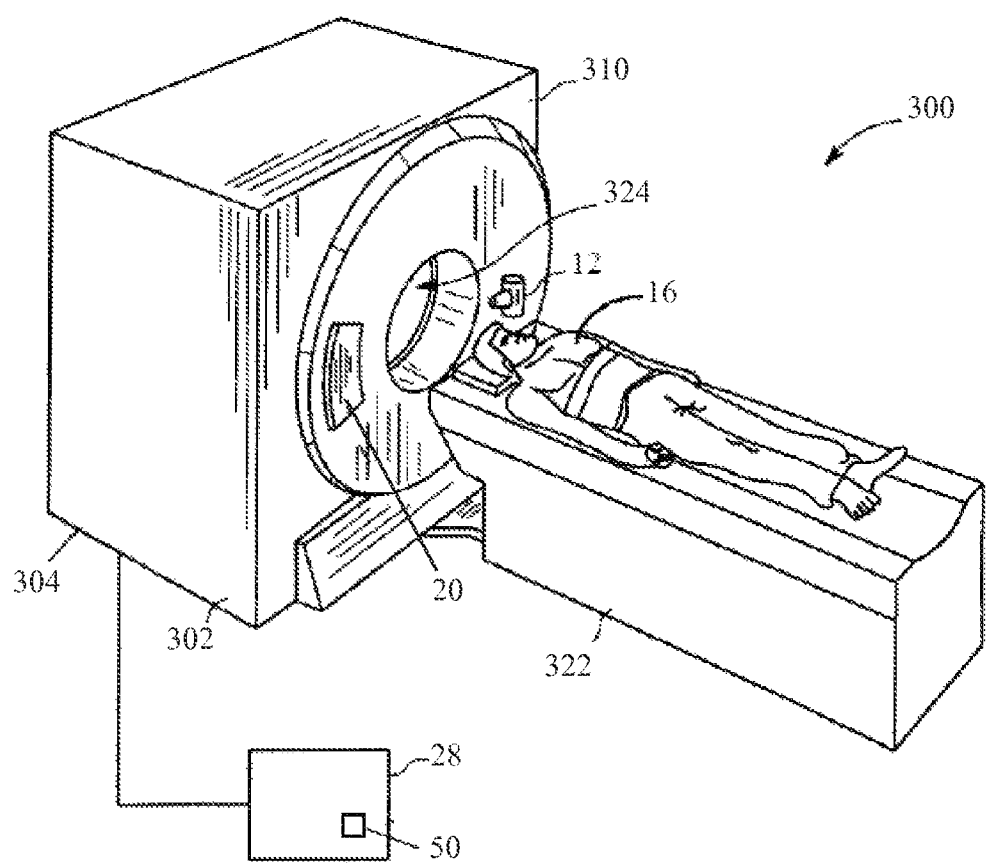
FIG. 7 is a pictorial view of a multi-modality imaging system formed in accordance with various embodiments.
Figure 8:
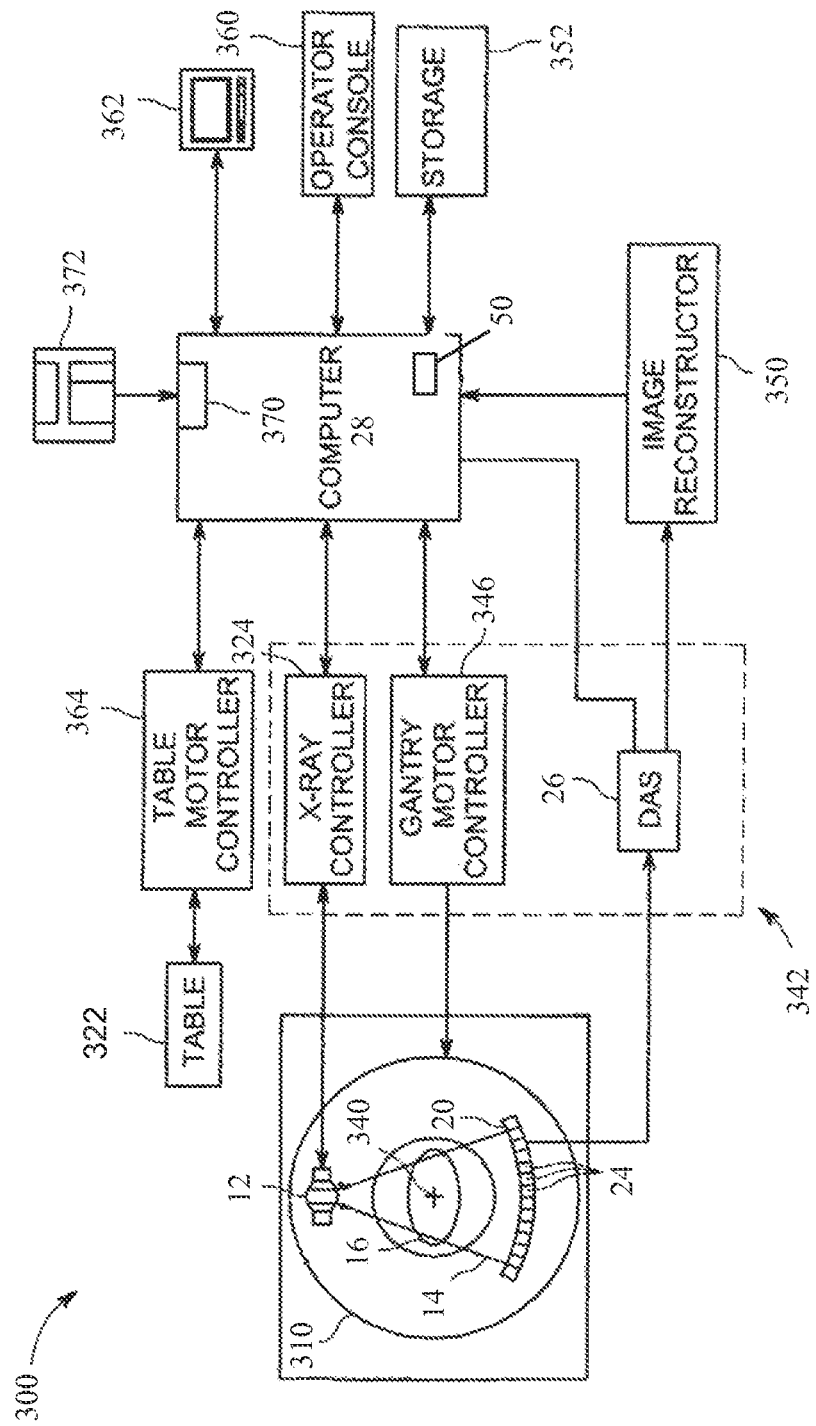
FIG. 8 is a block schematic diagram of the system illustrated in FIG. 7.

The various methods and the window generating module 50 may be implemented in an exemplary imaging system. For example, FIG. 7 is a pictorial view of an imaging system 300 that is formed in accordance with various embodiments. FIG. 8 is a block schematic diagram of a portion of the multi-modality imaging system 300 shown in FIG. 7. Although various embodiments are described in the context of an exemplary dual modality imaging system that includes a CT imaging system and a PET imaging system, it should be understood that other imaging systems capable of performing the functions described herein are contemplated as being used.

The multi-modality imaging system 300 is illustrated, and includes a CT imaging system 302 and a PET imaging system 304. The imaging system 300 allows for multiple scans in different modalities to facilitate an increased diagnostic capability over single modality systems. In one embodiment, the exemplary multi-modality imaging system 300 is a CT/PET imaging system 300. Optionally, modalities other than CT and PET are employed with the imaging system 300. For example, the imaging system 300 may be a standalone CT imaging system, a standalone PET imaging system, a magnetic resonance imaging (MRI) system, an ultrasound imaging system, an x-ray imaging system, and/or a single photon emission computed tomography (SPECT) imaging system, interventional C-Arm tomography, CT systems for a dedicated purpose such as extremity or breast scanning, and combinations thereof, among others.

The CT imaging system 302 includes a gantry 310 that has the x-ray source 12 that projects the beam of x-rays 14 toward the detector array 20 on the opposite side of the gantry 310. The detector array 20 includes the plurality of detector elements 24 that are arranged in rows and channels that together sense the projected x-rays that pass through an object, such as the subject 16. The imaging system 300 also includes the computer 28 that receives the projection data from the detector array 20 and processes the projection data to reconstruct an image of the subject 16. In operation, operator supplied commands and parameters are used by the computer 28 to provide control signals and information to reposition a motorized table 322. More specifically, the motorized table 322 is utilized to move the subject 16 into and out of the gantry 310. Particularly, the table 322 moves at least a portion of the subject 16 through a gantry opening 324 that extends through the gantry 310.

The imaging system 300 also includes the window generating module 50 that is configured to implement various methods described herein. For example, the module 50 may be configured automatically generate a window level setting and a window width setting in real-time and utilize the window level setting and window width setting to reconstruct an image of the subject 16. The module 50 may be implemented as a piece of hardware that is installed in the computer 28. Optionally, the module 50 may be implemented as a set of instructions that are installed on the computer 28. The set of instructions may be stand alone programs, may be incorporated as subroutines in an operating system installed on the computer 28, may be functions in an installed software package on the computer 28, and the like. It should be understood that the various embodiments are not limited to the arrangements and instrumentality shown in the drawings.

As discussed above, the detector 20 includes a plurality of detector elements 24. Each detector element 24 produces an electrical signal, or output, that represents the intensity of an impinging x-ray beam and hence allows estimation of the attenuation of the beam as it passes through the subject 16. During a scan to acquire the x-ray projection data, the gantry 310 and the components mounted thereon rotate about a center of rotation 340. FIG. 8 shows only a single row of detector elements 24 (i.e., a detector row). However, the multislice detector array 20 includes a plurality of parallel detector rows of detector elements 24 such that projection data corresponding to a plurality of slices can be acquired simultaneously during a scan.

Rotation of the gantry 310 and the operation of the x-ray source 12 are governed by a control mechanism 342. The control mechanism 342 includes the x-ray controller 24 that provides power and timing signals to the x-ray source 12 and a gantry motor controller 346 that controls the rotational speed and position of the gantry 310. The data acquisition system (DAS) 26 in the control mechanism 342 samples analog data from detector elements 24 and converts the data to digital signals for subsequent processing. For example, the subsequent processing may include utilizing the module 50 to implement the various methods described herein. An image reconstructor 350 receives the sampled and digitized x-ray data from the DAS 26 and performs high-speed image reconstruction. The reconstructed images are input to the computer 28 that stores the image in a storage device 352. Optionally, the computer 28 may receive the sampled and digitized x-ray data from the DAS 26 and perform various methods described herein using the module 50. The computer 28 also receives commands and scanning parameters from an operator via a console 360 that has a keyboard. An associated visual display unit 362 allows the operator to observe the reconstructed image and other data from computer.

The operator supplied commands and parameters are used by the computer 28 to provide control signals and information to the DAS 26, the x-ray controller 24 and the gantry motor controller 346. In addition, the computer 28 operates a table motor controller 364 that controls the motorized table 322 to position the subject 16 in the gantry 310. Particularly, the table 322 moves at least a portion of the subject 16 through the gantry opening 324 as shown in FIG. 7.

Referring again to FIG. 8, in one embodiment, the computer 28 includes a device 370, for example, a CD-ROM drive, DVD drive, magnetic optical disk (MOD) device, or any other digital device including a network connecting device such as an Ethernet device for reading instructions and/or data from a non-transitory computer-readable medium 372, such as a floppy disk, a CD-ROM, a DVD or an other digital source such as a network or the Internet, as well as yet to be developed digital means. In another embodiment, the computer 28 executes instructions stored in firmware (not shown). The computer 28 is programmed to perform functions described herein, and as used herein, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein.

In the exemplary embodiment, the x-ray source 12 and the detector array 20 are rotated with the gantry 310 within the imaging plane and around the subject 16 to be imaged such that the angle at which an x-ray beam 374 intersects the subject 16 constantly changes. A group of x-ray attenuation measurements, i.e., projection data, from the detector array 20 at one gantry angle is referred to as a "view". A "scan" of the subject 16 comprises a set of views made at different gantry angles, or view angles, during one revolution of the x-ray source 12 and the detector 20. In a CT scan, the projection data is processed to reconstruct an image that corresponds to a two dimensional slice taken through the subject 16.

Exemplary embodiments of a multi-modality imaging system are described above in detail. The multi-modality imaging system components illustrated are not limited to the specific embodiments described herein, but rather, components of each multi-modality imaging system may be utilized independently and separately from other components described herein. For example, the multi-modality imaging system components described above may also be used in combination with other imaging systems.

As used herein, the phrase "reconstructing an image" is not intended to exclude embodiments of the present invention in which data representing an image is generated, but a viewable image is not. Therefore, as used herein the term "image" broadly refers to both viewable images and data representing a viewable image. However, many embodiments generate, or are configured to generate, at least one viewable image.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A method for generating an image of an object, said method comprising:
    scanning a patient to generate a transmission dataset;
    segmenting the transmission dataset to generate a 3D volume dataset of an object of interest;
    automatically generating a window level setting and a window width setting based on pixel values distributed throughout the 3D volume dataset; and
    automatically displaying an image of the object of interest using the window width setting and the window level setting, wherein the object of interest is an aorta.

2. The method of claim 1, wherein the window width setting is based on the window level setting.

3. The method of claim 1, wherein analyzing the 3D volume dataset comprises:
    determining an average pixel intensity value for the 3D volume dataset; and
    generating the window level setting based on the average pixel intensity value.

4. The method of claim 1, wherein analyzing the 3D volume dataset comprises:
    determining an average pixel intensity value for the 3D volume dataset; and
    setting the window level setting equal to the average pixel intensity value.

5. The method of claim 1, wherein analyzing the 3D volume dataset comprises:
    determining an average pixel intensity value for the 3D volume dataset;
    generating the window level setting based on the average pixel intensity value; and
    setting the window width setting equal to three times the value of the window level setting.

6. The method of claim 1, wherein segmenting the transmission dataset further comprises determining at least one axial slice on which an ascending aorta and a descending aorta are identified.

7. The method of claim 1, wherein segmenting the transmission dataset further comprises identifying at least three axial slices on which an ascending aorta and a descending aorta are shown.

8. An imaging system comprising:
    an imaging scanner; and
    a processor coupled to the imaging scanner, the processor configured to:
    control the imaging scanner to generate a transmission dataset;
    segment the transmission dataset to generate a 3D volume dataset of an object of interest;
    generate a window level setting and a window width setting based on pixel values throughout the 3D volume dataset; and
    automatically display an image of the object of interest using the window width setting and the window level setting wherein the object of interest is an aorta.

9. The imaging system of claim 8, wherein the window width setting is based on the window level setting.

10. The imaging system of claim 8, wherein the processor is further configured to:
    determine an average pixel intensity value for the 3D volume dataset; and
    generate the window level setting based on the average pixel intensity value.

11. The imaging system of claim 8, wherein the processor is further configured to:
    determine an average pixel intensity value for the 3D volume dataset; and
    set the window level setting equal to the average pixel intensity value.

12. The imaging system of claim 8, wherein the processor is further configured to:
    determine an average pixel intensity value for the 3D volume dataset;
    generate the window level setting based on the average pixel intensity value; and
    set the window width setting equal to three times the value of the window level setting.

13. The imaging system of claim 8, wherein the processor is further configured to determine at least one axial slice on which an ascending aorta and a descending aorta are identified.

14. The imaging system of claim 8, wherein the processor is further configured to identify at least three axial slices on which an ascending aorta and a descending aorta are shown.

15. A non-transitory computer readable medium being programmed to instruct a computer to:
   receive a transmission dataset from a scan of a patient;
   segment the transmission dataset to generate a 3D volume dataset of an object of interest;
   generate a window level setting and window width setting based on pixel values distributed throughout the 3D volume dataset; and
   automatically display an image of the object of interest using the window width setting and the window level setting wherein the object of interest is an aorta.

16. The non-transitory computer readable medium of claim 15, further programmed to instruct the computer to
   determine an average pixel intensity value for the 3D volume dataset; and
   generate the window level setting based on the average pixel intensity value.

17. The non-transitory computer readable medium of claim 15, further programmed to instruct the computer to:
   determine an average pixel intensity value for the 3D volume dataset; and
   set the window level setting equal to the average pixel intensity value.

18. The non-transitory computer readable medium of claim 15, further programmed to instruct the computer to:
   determine an average pixel intensity value for the 3D volume dataset;
   generate the window level setting based on the average pixel intensity value; and
   set the window width setting equal to three times the value of the window level setting.

\* \* \* \* \*